Figure 1:
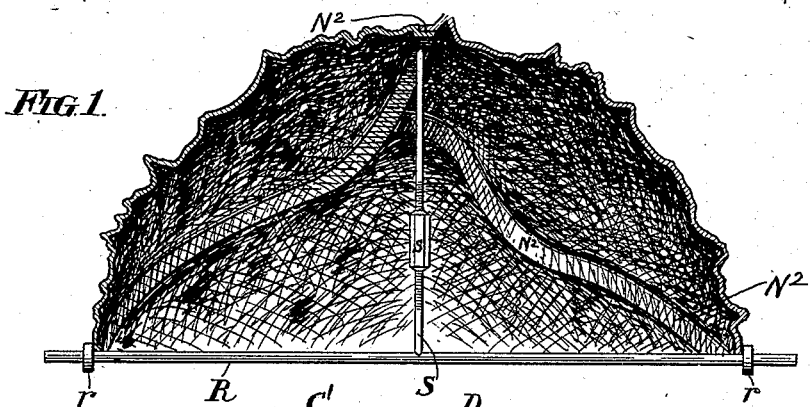

(No Model.)  2 Sheets—Sheet 1.

T. JONES.
GLOBE AND METHOD OF MAKING SAME.

No. 553,409. Patented Jan. 21, 1896.

Witnesses:
J. Halpenny
A. H. Cooper.

Inventor:
Thomas Jones
By his attorneys
Gridley & Hopkins (No Model.) 2 Sheets—Sheet 2.
T. JONES.
GLOBE AND METHOD OF MAKING SAME.
No. 553,409. Patented Jan. 21, 1896.
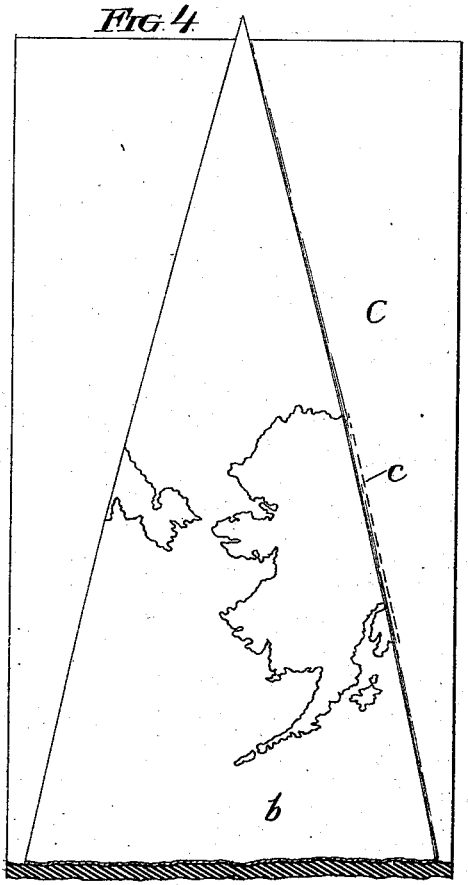
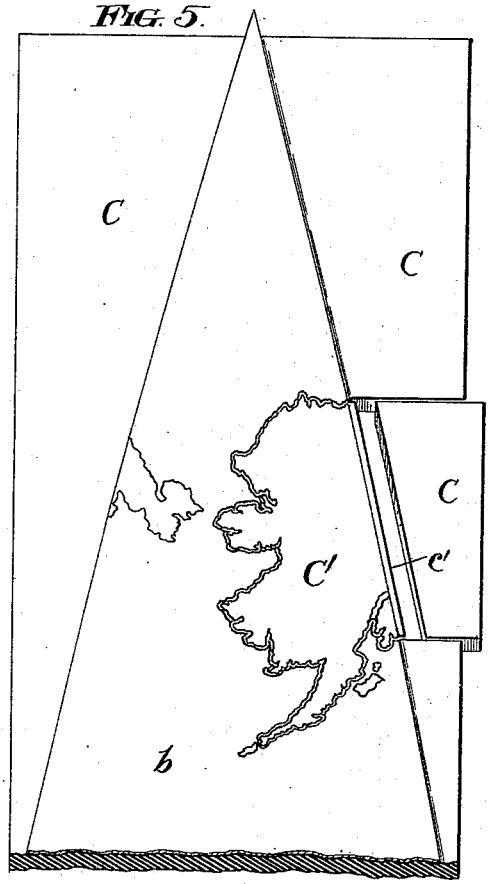
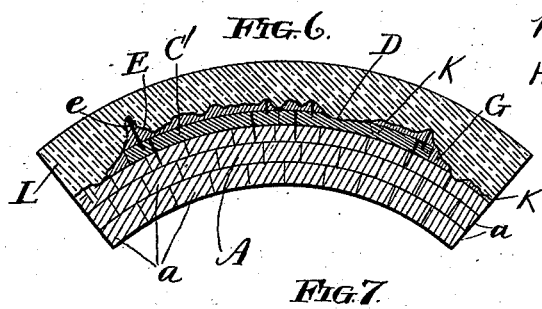
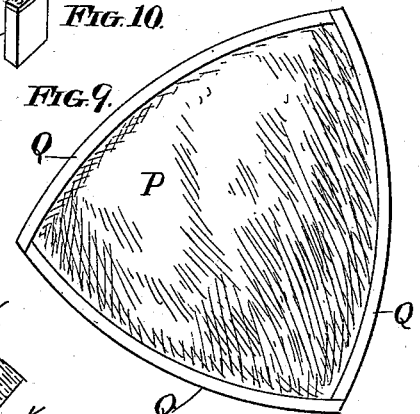
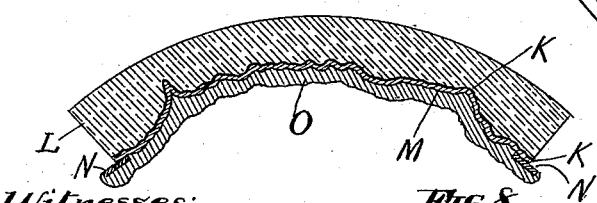
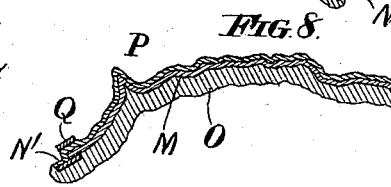
Witnesses:
J. Halpenny
A. H. Cooper.
Inventor:
Thomas Jones
By his attorneys

UNITED STATES PATENT OFFICE.

THOMAS JONES, OF CHICAGO, ILLINOIS.

GLOBE AND METHOD OF MAKING SAME.

SPECIFICATION forming part of Letters Patent No. 553,409, dated January 21, 1896.

Application filed May 16, 1894. Serial No. 511,412. (No model.)

*To all whom it may concern:*

Be it known that I, THOMAS JONES, a citizen of the United States, residing at Chicago, in the county of Cook and State of Illinois, have invented certain new and useful Improvements in the Method of Making Globes, of which the following is a specification.

Prior to the making of the present invention a so-called "relief-globe" had never been made of metal, nor had a relief-globe showing the topography of the ocean-beds, as well as of the land portions of the earth, ever been made; and the object of the present invention is to provide a relief-globe of this description.

The invention involves a process by which an accurate model of the earth is made, and a further process by which accurate copies of this model may be made at a cost which will place them within the reach of people and institutions of moderate means.

In carrying out the present invention a spherical backing, consisting of a ball of wood, is covered with map-gores, such as are used for covering globes of ordinary construction. A duplicate set of these gores is then pasted upon sheet-lead, and by the use of a scroll or fret saw the sheet-lead is cut upon lines following the coast-lines, so as to separate the land portions from the water portions. The pieces of sheet-lead which conform in outlines to the outlines of the land portions are then bent so that they conform accurately to the wooden ball or backing, and are secured to the ball in proper geographical relations to each other, the map which was pasted upon the surface of the ball serving as a guide for putting them in place. This gives a ball with uniformly-raised portions corresponding in outlines to the outlines of the land portions of the earth. The entire surface of this ball is then treated topographically, in the manner hereinafter described, so as to produce an accurate model of the earth, care being taken to cover all portions of the backing with wax. This model is then treated with plumbago, or some other suitable substance, to adapt it to receive a thin coating of metal, which is deposited upon it by the process of electrolysis, and after the deposit is made the model is cut into sections upon lines so laid as to avoid, as much as possible, cutting the land portions. A backing of plaster-of-paris or some other suitable material is then applied to the metal-coated surfaces of each of these sections, and when this backing has hardened the section is immersed in hot water, so as to dissolve the glue which holds the component parts of the wooden backing together and melt the wax which was used in the topographical treatment. This leaves an accurate electrotype or matrix of the original model, consisting of a thin film of metal, preferably copper, and the heavy backing of plaster-of-paris by which it is sustained. After suitably preparing the metallic surface of this matrix a coating of metal is applied to it by the process of electrolysis, this deposit being heavier than the first one. This done, the plaster-of-paris backing of the matrix is broken away and the thin metallic matrix is carefully stripped from the second electrotype, which latter, barring imperfections in the deposit, is an accurate copy of the original model. After these imperfections have been removed and this second model has been suitably prepared, as hereinafter described, a coating of metal is applied to its outer surface by the process of electrolysis, and this last electrotype, when removed, constitutes a second matrix, perfect in all respects, of which any number of copies may be successively made by the process of electrolysis, and these copies used in building up the completed relief-globes.

This process of making a relief-globe involves several sub-processes—namely, a process of making the first model, the process of making the first matrix, the process of making the second model, and the process of making the second matrix—each of which processes includes certain steps which are fully described with reference to the accompanying drawings, which are made a part hereof, and in which—

Figure 2:
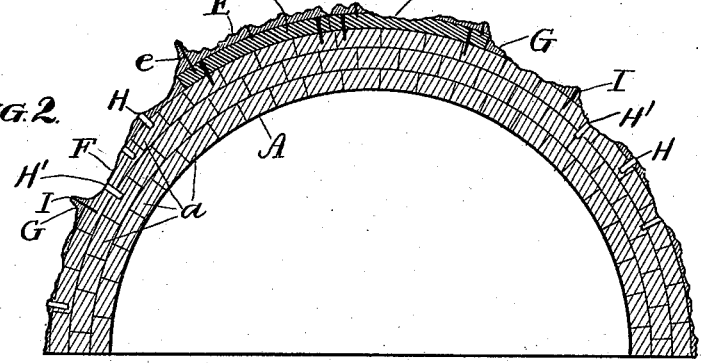
Figure 3:
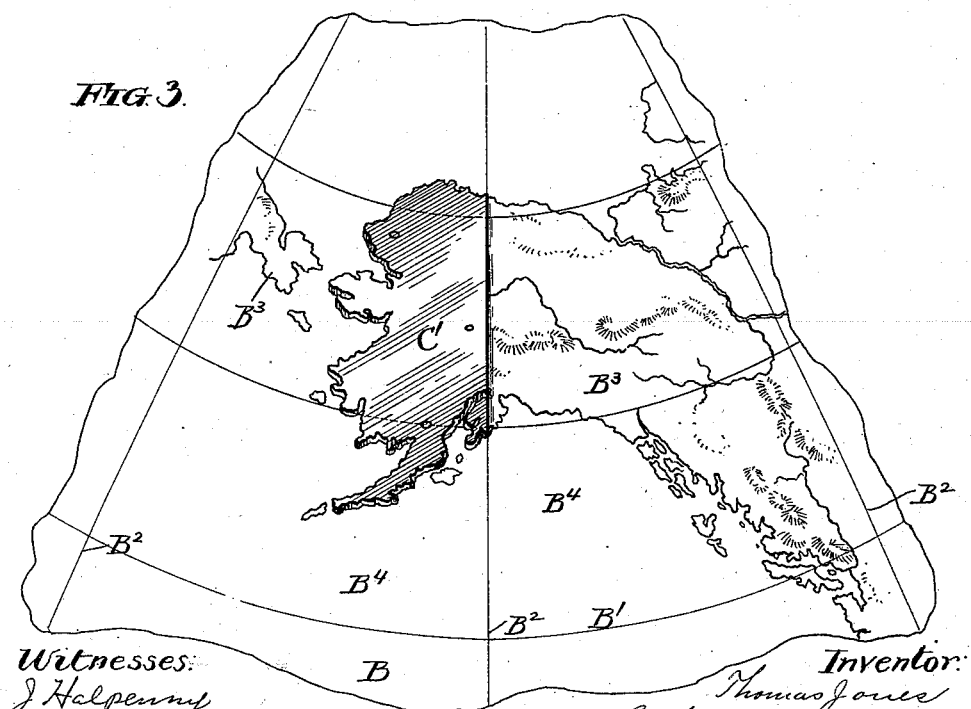

Figure 1 is an axial section of one-half of a relief-globe made in accordance with the present invention. Fig. 2 is an axial section of one-half of a model of the earth, said model being made in accordance with the present invention and used in making complete relief-globes in accordance with said invention. Figs. 3, 4, and 5 are plan views showing different steps in the process of constructing or building up the first model shown in Fig. 2. Fig. 6 is a section of the first matrix before the removal of the section of the model from which it is made. Fig. 7 is a section of the second model, made from the first matrix, before the removal of said matrix. Fig. 8 is a section of the second or final matrix, made from the second model, before the removal of said model. Fig. 9 is a plan of the rear side of said matrix. Fig. 10 is a perspective view of a block which is used, as hereinafter described, in the topographical treatment of those portions of the earth whose surfaces are below the level of the sea.

A represents the hollow ball which constitutes the foundation or backing upon which the first model is built up, and which is made of a number of pieces of wood $a$ glued together. In Fig. 3 is shown a plan view, on a very much larger scale, of a portion of this ball covered with map-gores B B', such as are used for the coverings of globes of ordinary construction, the meeting edges of the said gores being indicated by the line $B^2$. It will be understood that upon these gores is printed a map upon which are represented in the customary manner land-surfaces $B^3$ and water-surfaces $B^4$.

In Figs. 4 and 5 C represents a piece of sheet-lead upon which is pasted a map-gore $b$, which is an exact duplicate of the gore B. After this gore $b$ is pasted to the sheet C the latter is dissected by means of a scroll-saw upon a line which follows the coast-line and upon a line (dotted at $c$) which is parallel with but a short distance from the edge of the gore. This cutting results in a piece of sheet-lead C', (shown in Fig. 5,) the outline of which corresponds exactly with the outline of the land-surface represented upon the gore, excepting that it has a lip $c'$ for a purpose that will appear presently. All of the several gores going to make up the complete covering of the globe are treated in exactly this manner, so as to give pieces of lead similar to the piece C' corresponding in outlines to the outlines of the various land-surfaces and having tongues similar to the tongue $c'$ wherever the cutting follows the edge of the gore.

For the sake of simplicity this specification will be largely confined to a description of the manner of handling and treating the single gore shown at $b$ in Figs. 3, 4, and 5.

The piece of sheet-lead C', when separated, is bent so that its under surface corresponds in concavity to the convexity of the ball, and the piece is then secured to the ball by tacks or the like in such position that its edges corresponding to the coast-line register exactly with the corresponding coast-line of the map which is on the ball. It is of course understood that in an accurate globe each geographical feature of the earth's surface embraces a certain number of degrees, or a certain proportion of the entire area of the globe, and hence globes of different sizes require maps or coverings of different sizes. If a map of the proper size for a globe of the size of the ball A were applied to a globe of the size of the ball plus the thickness of the sheet-lead which is secured to it the several geographical features would be out of proportion to the size of the globe. This being so, when the several pieces of lead corresponding in outlines to the outlines of the land-surfaces of the map are secured to the ball in their appropriate places the under side of said pieces will accurately fit the map upon the ball; but between their meeting edges (if they are cut directly upon the lines marked by the edges of the gores) will be openings which diverge outward. It is in order to avoid the formation of these openings that wherever a land-surface is intersected by the edge of the gore in cutting the lead a projecting lip, such as $c'$, is left, and these lips are so treated while the pieces of lead are being made to conform to the shape of the ball that when the several pieces are put in place their edges are radial with respect to the ball and come together, as shown in Fig. 2. When these pieces of sheet-lead representing the entire land-surface (meaning thereby the continents and larger islands) have been secured in place upon the ball, their surfaces are treated topographically, so as to make them present in miniature a representation of the various prominent topographical features of said land-surfaces. The several features are modeled upon a given scale, and in order to facilitate this the surface of the lead is taken as representing or corresponding with the level of the sea. Where the surface of the earth is below this level the lead is cut away, as shown at D, by means of a suitable tool, and where the surface of the earth is above the level wax is applied to it, as shown at E, and molded to the proper height. Where a high mountain occurs the wax is molded around a pin $e$, which is driven into the lead, the object of the pin being to afford lateral support for the wax and serve as a gage for measuring the depth of the wax. After the land-surfaces have all been thus topographically treated, the surfaces which are covered by water are similarly treated, the surface of the ball being cut away where it is too high, and wax applied to it and molded to the proper shape where it is too low. In the model that I have already made the scale is one-sixtieth of an inch to one thousand feet, and I found it convenient to use sheet-lead twelve-sixtieths of an inch in thickness, so that the surface of the ball, without treatment, represented a uniform level twelve thousand feet below the level of the sea. Where the level of the bed of the sea is more than twelve thousand feet below the level of the sea, the surface of the ball is cut away, as shown at F, and where it is less than twelve thousand feet wax is applied to it, as shown at G.

For convenience in treating the ball topographically I prefer to make use of blocks H, which are of such height that they bear a certain relation to the scale of the work, those heretofore used being twelve-sixtieths of an inch in height. In using these blocks the level of the bed of the sea at a given point is first ascertained. Let it be supposed, for example, that at the point where the block lettered H in Fig. 2 is located the bed of the sea is three thousand feet below the sea-level. It is known that the surface of the ball, according to the scale, is twelve thousand feet below the sea-level, and that the height of the block represents twelve thousand feet. In order, therefore, to provide an accurate gage for applying the wax to this portion of the ball, it is simply necessary to sink the block into the ball three-sixtieths of an inch, or one-fourth its height, leaving it projecting nine-sixtieths of an inch, so that when the wax is filled in to the level of the top of the block it will represent the proper depth, the depth being properly indicated by the raised figures on a strip of metal or rubber $h$ attached to the top of the block, as shown in Fig. 10. On the other hand, let it be supposed that at a point where the block lettered H' is located the bed of the sea is fifteen thousand feet below the normal sea-level. Here the surface of the ball must be cut away to a depth of three-sixtieths of an inch; but in doing this the block is of no use as a gage. The block is, however, used as a convenient means for applying the numerals showing the depth at this point.

Wherever a small island occurs a pin I is driven into the ball and allowed to project therefrom such distance as to form a guide for applying the wax.

It will be understood that Fig. 2 is not a geographically or topographically correct section of any portion of the earth, but that it is simply an illustration of the manner of carrying out the process of making an accurate model of the earth.

All portions of the ball are treated as above described until an exact model of the earth is produced. This done, all exposed portions of the ball are carefully covered with wax so as to exclude liquid, and the entire surface of the ball is treated with plumbago or other material to adapt it to receive a thin coating K of copper, which is applied to it by the process of electrolysis, after which the ball is cut into sections, and the cutting preferably follows lines so laid as to avoid, as much as possible, cutting the land-surfaces. All of the several sections of the ball thus produced are subsequently treated in the same manner, and the description of the treatment of one of them will of course suffice for the purpose of this specification. In Fig. 6 is shown one of these sections of the model after it is thus coated, and a thick layer of plaster-of-paris or similar material is put upon its outer surface, as shown at L. After this backing has hardened the section, in exactly the condition in which it is shown in Fig. 6, is immersed in hot water, and there allowed to remain until all of the glue which holds together the several pieces of wood $a$ is dissolved, allowing said pieces to separate, and the wax E and G with which the surface of the ball was treated topographically is melted, permitting the lead covering to fall away. This leaves a matrix consisting of the heavy backing L of plaster-of-paris and the thin film of sheet metal K, the surface of which is a complement of the outer surface of the model-section from which it was made. The surface of this matrix is then treated with plumbago or similar material in order to adapt it to receive, by the process of electrolysis, a heavy coating of metal, such as is shown at M in Fig. 8. After this coating M has been deposited the plaster-of-paris backing L is broken away and the thin deposit K is stripped off, leaving the heavy deposit or second model M, and this latter is a reproduction of the first model. This second model is then treated topographically with solder or similar material for the purpose of removing all imperfections and inaccuracies and making it an accurate model of that portion of the earth's surface which it represents. This done, a strip N of metal is secured to its back so as to project beyond its margins and form a lip. This lip is not formed on all sides of all of the several sections of the model, but only upon such parts that when the several sections are assembled in a globe of every two meeting edges one will have the lip and the other will not, the object of the lip being to give lateral support to the meeting edges of the several sections. This done, the curvature of the several sections of this model is tested and all inaccuracies in this respect corrected, and in order to make this test the several parts are assembled in proper relations to each other and temporarily "tacked" together by solder applied to their meeting edges at intervals. When they are found to be accurate in this respect they are again taken apart, and to each is applied a coating of wax O which covers its back and the back and outside edge of the lip, so as to prevent the electrotyping solution from coming in contact with these parts. The metal surface of the model is then treated so as to prepare it for a coating of metal, applied by the process of electrolysis, and the model is then immersed in the electrotyping bath and allowed to remain there until it receives a heavy coating P, which, so far as the topographical features is concerned, is a reproduction of the first matrix, but without its inaccuracies. This second matrix has on its inner surface a raised rib N', resulting from the deposit of metal upon the lip N of the model M, the object of which will appear hereinafter. This last deposit is of sufficient thickness to give it adequate strength, so that in all ordinary use it will be self-sustaining; but as an additional safeguard against its being distorted I prefer to secure to its back a binding-strip Q. This gives the completed matrix, of which any number of copies in reverse may be made by the process of electrolysis, as already described, and these copies are used in building up the relief-globes. Each section will be an accurate representation of a given portion of the earth, and some of them will have depressed marginal lips $N^2$, resulting from the deposit of metal on the raised rib $N'$ of the second matrix P.

In Fig. 1 I have shown a portion of a globe built up of these globe-sections, the figure showing the parts during the process of being secured together. Such of the sections as extend to the poles are provided at these points with notches for receiving an axis R, which is provided with a pair of fixed collars or shoulders $r$ for the purpose of confining the globe-sections against endwise movement thereon. The lips $N^2$ form bearings for the margins of adjacent globe-sections, and hold the meeting edges of the two sections against lateral displacement. When the several sections are in place their meeting edges are securely soldered together.

In securing the several sections together it is necessary of course to bring them to the proper positions with relation to each other and to temporarily support them in these positions. In order to accomplish these results I prefer to make use of posts or struts, such as shown at S in Fig. 1, each of which is formed in two parts whose meeting ends are provided with right and left threads and are coupled together by a correspondingly-threaded sleeve, so that when one end of said strut is temporarily secured by a drop of solder to the inside of a globe-section and the other similarly secured to the axis R, by turning the coupling-sleeve in one direction or the other the strut may be lengthened or shortened, as may be necessary, in order to bring the edge of the globe-section to proper place.

The globe when completed may be colored, bronzed, oxidized, or finished in any way that fancy may dictate.

What I claim as new, and desire to secure by Letters Patent, is—

1. As a new article of manufacture, a model of the earth having a backing formed of a number of pieces united by glue or other material soluble in water, a covering arranged thereon and corresponding in outline to the outline of the land portions of the earth, said covering and the uncovered portions of the backing being treated to topographically represent the earth, substantially as set forth.

2. The process of making a model of the earth, which consists in pasting upon sheet-lead map gores, dissecting said sheet-lead upon lines following the coast-lines, so as to separate portions corresponding in outline to the outline of the land portions of the earth, securing these portions of the lead to a ball in their proper geographical positions, and treating the entire surface of the ball and lead to topographically represent the surface of the earth, substantially as set forth.

3. The process of making a model of the earth, which consists in arranging upon a ball a map for use as a guide in subsequent steps of the process, pasting a duplicate of this map upon sheet-lead, dissecting said sheet-lead upon lines which follow the coast-lines of the map which is pasted upon it, so as to produce pieces of lead corresponding in outline to the outline of land portions of the earth, bending these last named pieces of lead to conform to the surface of the ball and securing them thereto in their proper geographical positions as indicated by the map on the ball, and then treating the entire surface of the ball and covering to topographically represent the surface of the earth, substantially as set forth.

4. The process of making a model of the earth, which consists in pasting upon sheet-lead map gores, dissecting said sheet-lead upon lines which follow the coast-lines and upon lines parallel with but some distance outside of the edge of the gore, so as to produce pieces of sheet-lead corresponding in outline to the outline of land portions of the earth, bending these pieces of sheet-lead to conform to the surface of the ball, securing them thereto in proper geographical positions, and treating their surfaces and the surface of the uncovered portions of the ball to topographically represent the surface of the earth, substantially as set forth.

5. The process of making a model of the earth, which consists in securing map gores upon sheet-lead, dissecting said sheet-lead upon lines which follow the coast-lines, so as to produce pieces of sheet-lead corresponding in outline to the outline of the land portions of the earth, bending said pieces of sheet-lead to conform to the surface of the ball and securing them thereto, and treating the surfaces of said sheet-lead and the uncovered portions of the ball to topographically represent the surface of the earth, the surfaces of the land and ball being either cut away or built up with plastic material, as may be necessary, substantially as set forth.

6. The process of making a sectional model of the earth, which consists in securing to a hollow ball a covering corresponding in outline to the outline of the land portions of the earth, treating the surfaces of said covering and the uncovered portions of the ball to topographically represent the surface of the earth, depositing upon the ball thus treated a thin coating of metal, and subsequently cutting the ball into sections, substantially as set forth.

7. The process of making matrices for the manufacture of relief globes, which consists in first making a model having its surface treated to topographically represent the surface of the earth, depositing upon this model a coating of metal and cutting this metal into separate sections, the model and the metal coating being separated, leaving the segregated metal matrix for use in subsequent steps of the process, substantially as set forth.

8. The process of making matrices for use in manufacturing relief globes, which consists in making a model having its surface treated to topographically represent the surface of the earth, depositing upon this model a coating of metal, cutting said model into sections, embedding the coating of metal in a backing of plastic material, and subsequently removing the model section, substantially as set forth.

9. The process of making relief globes, which consists in making a model having its surface treated to topographically represent the surface of the earth, depositing upon this model a coating of metal, cutting this model into sections, applying to the outer surface of the coating of metal a backing of plastic material, removing the model-section, leaving a hollow matrix consisting of the backing and thin coating of metal, depositing upon the inner surface of this matrix, by the process of electrolysis, a coating of metal, and subsequently breaking away the backing of the matrix and stripping off the thin coating of metal, leaving a model for use in subsequent steps of the process, substantially as set forth.

10. The process of making relief globes, which consists in making a model of the earth having its surface treated to topographically represent the surface of the earth, making, by the process of electrolysis, a matrix of this model, making an electrotype of this matrix for use as a second model, treating the surface of this second model to remove inaccuracies and defects, and making an electrotype of this second model, thus forming a final matrix, of which any desired number of copies may be made by the process of electrolysis, substantially as set forth.

11. The process of making relief globes, which consists in making a sectional model of the earth having its surface treated with wax to topographically represent the surface of the earth, and coated with metal, securing to the outside of this coating of metal a backing of plastic material, and subjecting the whole to heat in order to melt the wax with which the surface of the model-section was treated, thus leaving a matrix consisting of the metal deposit and its backing, substantially as set forth.

THOMAS JONES.

Witnesses:
L. M. HOPKINS,
J. HALPENNY.